Patented Sept. 28, 1948

2,449,992

UNITED STATES PATENT OFFICE 2,449,992

PREPARATION OF BETA-THIO CARBOXYLIC ACID COMPOUNDS

Thomas L. Gresham and Forrest W. Shaver, Akron, Ohio, assignors to The B. F. Goodrich Company, New York, N. Y., a corporation of New York No Drawing. Application October 5, 1945, Serial No. 620,660

6 Claims. (Cl. 260—516)

1

This invention relates to the preparation of beta-substituted carboxylic acids, particularly propionic acids, in which a thio linkage, —S—, is attached to the carbon atom in beta position to the carboxylic acid group, and is particularly concerned with the preparation of such compounds by the reaction of beta-lactones with mercaptans.

It is disclosed in U. S. Patent 2,356,459 to Frederick E. Küng, that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

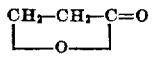

is economically obtained from ketene and formaldehyde.

We have now discovered that beta-propiolactone, and also the other beta-lactones, will react with mercaptans, either as such or in the form of their salts, to produce beta-thio carboxylic acid compounds; and that this reaction provides a convenient and economical route to numerous useful organic compounds many of which have not heretofore been prepared or have been obtained only with difficulty and/or from relatively costly raw materials.

The reaction proceeds, in general, as represented by the following equation:

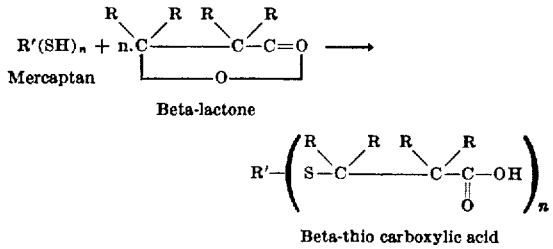

wherein R' represents an organic radical, in which all hydrogen atoms are attached to carbon preferably a radical having its connecting valence on a carbon atom of a hydrocarbon group; $n$ is an integer corresponding to the number of mercapto groups in the mercaptan; R represents hydrogen or a substituent radical; and H is replaceable by a salt-forming group.

No special conditions for the reaction are necessary, the reaction proceeding whenever it is possible to bring the reactants into effective contact

2 with one another. Thus, simply by mixing the mercaptan and the beta-lactone and refluxing the mixture in the absence of added materials or in the presence of an inert solvent or diluent such as benzene, it is possible to obtain the desired beta-thio carboxylic acid. Higher yields, however, are generally secured by employing a polar solvent such as water, alcohol or the like, and carrying out the reaction in the presence of an inorganic base such as an alkali metal hydroxide or ammonium hydroxide which reacts with the mercaptan to form a salt thereof soluble in the solvent. When the reaction is effected in this way it is preferable first to prepare an aqueous solution containing the mercaptan and the base (that is, an aqueous solution of the mercaptan salt) and then to add the beta-lactone to this solution, the mercaptan salt reacting with the beta-lactone to produce a salt of the beta-thio carboxylic acid from which the free acid is liberated as an insoluble material on addition of mineral acid to the solution.

As indicated by the equation, one molecular proportion of beta-lactone for each molecular proportion of mercapto radical present in the mercaptan is theoretically required for the reaction and substantially this amount is preferably employed, but an excess of either of the reactants may be used if desired without appreciably influencing the yield of the product. Similarly, the amount of base, if such a material is used, is preferably chemically equivalent to the mercapto radical of the mercaptan or, if desired, is in excess of this amount. When the reaction yields, as the initial product, a solution of a salt of the beta-thio carboxylic acid, this carboxylic acid salt may react with excess beta-lactone in the manner described in the copending application of Thomas L. Gresham and Jacob Eden Jansen, Serial No. 620,658, filed October 5, 1945, but this side reaction does not occur to any appreciable extent so long as there remains any unreacted mercaptan salt, and hence does not introduce any substantial complications.

Other conditions for the reaction such as temperature and pressure are not critical and may be varied widely. Highest yields of the desired product are generally secured when working at temperatures from 0 to 100° C., preferably from 0 to 50° C., and at atmospheric pressure. The most convenient temperature, especially when the reaction is carried out in aqueous solution, is from about 20 to 50° C., since the reaction is exothermic and this temperature is maintained without appreciable heating or cooling of the solution. Temperatures as low as −20° C. or lower or as high as 200° C. or even higher, however, are also operable.

The mercaptan used in the reaction as such or in the form of a solution of a salt thereof may be, in general, any mercaptan in which all of the hydrogen atoms except those attached to carbon are present in mercapto groups. This includes aliphatic, aromatic and alicyclic mercaptans consisting exclusively of hydrocarbon structure linked to one or more mercapto groups, and also aliphatic, aromatic and alicyclic mercaptans containing elements other than carbon and hydrogen in the structure linked to mercapto, such as the halogens, oxygen, sulfur and nitrogen, present in substituent groups free from hydrogen atoms such as chloro, bromo, iodo, nitro, oxy, keto, thio, cyano, nitrilo, etc. As examples of mercaptans of the former type there may be mentioned ethyl, isopropyl, n-butyl, tert-butyl, sec-amyl, n-hexyl, 2-ethylhexyl, decyl, lauryl, triisobutyl, cetyl, octadecyl and other alkyl mercaptans and mixtures of these; allyl mercaptan and other alkenyl mercaptans; 1,2-ethanedithiol and other alkalene mercaptans; thiophenol, thiocresols, thionaphthols, dithio resorcinol, dithiohydroquinone and other aryl and arylene mercaptans; cyclohexyl mercaptan and other alicyclic mercaptans; benzyl mercaptan and other aralkyl mercaptans and the like. Substituted mercaptans containing in addition to mercapto structure, substituent groups free from hydrogen or having hydrogen attached only to carbon include chloroaliphatic and aromatic mercaptans such as chloro-ethyl mercaptan and o-chloro-thiophenol; nitro-substituted mercaptans such as p-nitrothiophenol; ether substituted mercaptans such as phenoxyethyl mercaptan and thiophenoxyethyl mercaptan; esters, nitriles and N-dialkyl amides of thioglycollic acid, thiolactic acid, thiohydracrylic acid (beta-mercapto propionic acid), thiosalicylic acid and other mercapto carboxylic acids (such compounds may also be considered as substituted mercaptans) such as ethyl thioglycollate, ethyl thiohydracrylate and the like; and numerous other mercaptans of the character described.

Heterocyclic mercaptans such as mercaptofurans, mercapto-thiophenes, mercapto-pyrones, etc., are also included in the generic class of mercaptans. The reaction of nitrogen-containing heterocyclic mercaptans with beta-lactones is more fully disclosed and claimed in the copending application of Jacob Eden Jansen and Roger A. Mathes, Serial No. 620,662, filed October 5, 1945.

Beta-propiolactone, the simplest possible beta-lactone, is the preferred beta-lactone for use in this invention because of its low cost, and the ease with which it reacts with mercaptans to produce beta-thio propionic acid compounds. However, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used, as may other beta-lactones, to produce numerous other beta-thio carboxylic acid compounds. Other known beta-lactones include lactones of beta-hydroxy-monocarboxylic acids containing cycloalkyl, aryl and aralkyl substituents such as beta-cyclohexyl-beta-propiolactone, beta-phenyl-beta-propiolactone, alpha-phenyl-beta-propiolactone, beta-benzyl-beta-propiolactone and the like, all of which, like beta-propiolactone and its homologs, are of the general structure

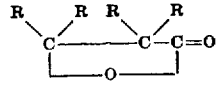

wherein R is hydrogen or an unreactive hydrocarbon group (i. e., a hydrocarbon group free from aliphatic unsaturation) and may be prepared in the manner described in the above mentioned Küng patent. Still other known beta-lactones include lactones of unsaturated beta-hydroxy carboxylic acids, mono-beta lactones of dicarboxylic acids and dilactones of dicarboxylic acids in which at least one of the lactones is beta, examples of which are alpha, alpha-dimethyl-beta-propiolactone-beta-carboxylic acid; trimethyl-beta-propiolactone-beta-carboxylic acid; beta, beta-dimethyl-beta-propiolactone-alpha-carboxylic acid; trimethyl-beta-propiolactone-alpha-carboxylic acid and the beta-delta-dilactone of citrylidene malonic acid, all of which like the beta-lactones before mentioned are composed exclusively of hydrogen, carbon and carbonoxy

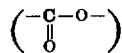

oxygen atoms. In addition to these compounds other compounds containing the structure

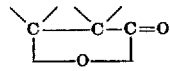

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (O-nitro-m-chlorophenyl)-beta-propiolactone; beta-(O-nitro-m-methoxyphenyl)-beta-propiolactone; alpha-hydroxy-beta-phenyl-beta-propiolactone and alpha-bromo-beta, beta-dimethyl-beta-propiolactone-alpha-carboxylic acid.

Thus, any of the generic class of beta-lactones may be used in the practice of this invention. When the reaction is carried out in aqueous solution, as is preferred, beta-lactones which are soluble in water (those beta-lactones containing no more than about six carbon atoms possess this property) are of course used.

The beta-thio carboxylic acids obtained by the reaction are characterized structurally by the presence of a thio-linkage —S— connected on the one hand to a carbon atom of an organic radical having all its hydrogen atoms connected to carbon and on the other hand to a carbon atom in beta position to a carboxyl group. Such compounds are useful as intermediates in the preparation of other compounds and for various other purposes.

In order further to illustrate the invention, the following specific examples are set forth. Unless otherwise indicated the parts are by weight.

*Example 1*

An aqueous sodium hydroxide solution is prepared by dissolving 20 parts of the base in 150 parts of water. 45 parts of tertiary-butyl mercaptan are then dissolved in the solution and the solution is cooled to about 5° C. 36 parts of beta-propiolactone are then added to the solution with stirring over a period of about one hour, the temperature of the solution being maintained by slight cooling below 30° C. The reaction mixture is allowed to stand at 30° C. for about two hours and is then made acid by addition of concentrated hydrochloric acid whereupon an insoluble oil separates from the solution. The solution is then extracted with ether, the ether evaporated and the product distilled. There is thus obtained 65.3 parts (81% yield) of a compound having the structure:

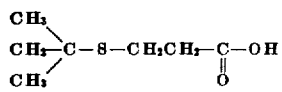

(which may be called beta (tertiary -butyl-thio) propionic acid or tert-butyl 2-carboxyethyl sulfide). This new compound, which is an oily liquid boiling at 98-99° C./1 mm. and having a molecular weight, acid number and sulfur content agreeing with the theoretical, is useful in the preparation of plasticizers and other useful compounds and for various other purposse.

*Example II*

The procedure of Example I is repeated using 59.1 parts of n-hexyl mercaptan in place of the tert-butyl mercaptan. The product consists of 57 parts (60% yield) of beta (n-hexyl-thio) propionic acid (or n-hexyl 2-carboxyethyl sulfide) which is an oily liquid boiling at 110-114° C./1 mm. and useful for the same purposes as the product of the preceding example.

When Example I is again repeated using in place of tert-butyl mercaptan or n-hexylmercaptan other aliphatic mercaptans of the general formula R'—SH wherein R' is an aliphatic hydrocarbon radical, preferably an alkyl radical such as ethyl, isopropyl, 2-ethylhexyl, lauryl, octadecyl or the like, similar compounds of the structure

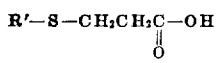

wherein R' is the same as just defined are obtained. The new compounds of this class are all useful in organic synthesis and for other purposes.

*Example III*

A mixture of 110 parts of thiophenol and 72 parts of beta-propiolactone are heated to 100° C. for about two hours. The reaction product is then distilled to separate unreacted beta-propiolactone and thiophenol. From the residue a 50% yield of beta-thiophenoxy propionic acid

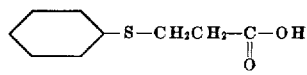

a solid melding at 60-61° C., is obtained.

*Example IV*

An aqueous solution is prepared by dissolving 40 parts of sodium hydroxide in 200 parts of water and then adding 110 parts of thiophenol. To this solution there is then added with stirring 72 parts of beta-propiolactone while maintaining the temperature of the solution during the addition at 20 to 30° C. After addition of the lactone the reaction mixture is allowed to stand for 2 hours, and is then acidified with concentrated hydrochloric acid. Upon cooling of the solution a precipitate of beta-thiophenoxy propionic acid appears. A 91% yield of this compound is obtained by separation of the precipitate.

When this example is repeated using one molecular proportion of dithioresorcinol and two molecular proportions of base and of beta-propiolactone, a high yield of thioresorcinol-beta-dipropionic acid, a solid melting at 123° C., and having the structure

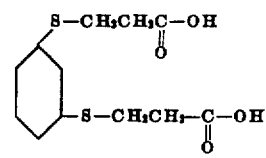

is obtained.

*Example V*

20.1 parts of ethyl thiohydracrylate and 6 parts of sodium hydroxide are added to 50 parts of water and the solution cooled to 3° C. 10.8 parts of beta-propiolactone are then added with stirring and sufficient cooling to maintain the temperature of the solution at 3 to 10° C. After the addition the reaction mixture is allowed to stand for about three hours to complete the reaction and then an additional 6 parts of sodium hydroxide are added and the mixture refluxed for three hours to hydrolyze the ester linkage present in the product. Concentrated hydrochloric acid is then added until the mixture is acid; the reaction mixture is extracted with ether and the ether removed, leaving 14.5 parts (54.5%) of beta-thio dipropionic acid, a solid melting at 125-128° C., obtained by the following equation:

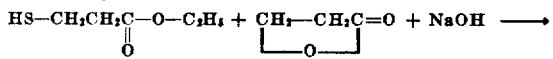

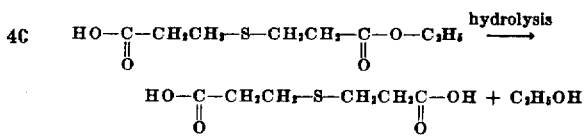

*Example VI*

The procedure of Example V is repeated using 31.4 parts of ethyl thioglycollate, 10.4 parts of sodium hydroxide and 18.7 parts of beta-propiolactone in the initial reaction, after which the product is refluxed for 4 hours with an additional 11 parts of sodium hydroxide to hydrolyze the ester. A 40% yield of S— carboxymethyl thiohydracrylic acid,

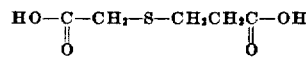

a solid melting at 94° C., is obtained.

Although the above specific examples illustrate the invention, it is not intended that the invention be limited thereto for numerous variations and modifications as set forth in the above disclosure and as will be apparent to those skilled in the art are included within the spirit and scope of the invention as defined in the appended claims.

We claim:

1. The method of preparing a beta-thio carboxylic acid which comprises preparing a solution containing a mercaptan consisting exclusively of mercapto structure attached to a hydrocarbon residue, dissolved in an alkaline aqueous solution, admixing the resulting solution with a water-soluble saturated aliphatic beta-lactone while maintaining the temperature in the range of 0 to 50° C., acidifying the solution and recovering the beta-thio carboxylic acid thus formed.

2. The method of preparing a beta-thio propionic acid which comprises preparing a solution containing a mercaptan consisting exclusively of mercapto structure attached to a hydrocarbon residue, dissolved in an aqueous solution of an alkali, adding beta-propiolactone to the solution while maintaining the temperature in the range of 0 to 50° C., acidifying the solution and recovering the beta-thio propionic acid thus formed.

3. The method of claim 2 wherein the mercaptan is an alkyl mercaptan and the compound recovered is a beta-alkyl thio propionic acid.

4. The method of claim 2 wherein the mercaptan is an aryl mercaptan and the compound recovered is a beta-aryl thio propionic acid.

5. The method of preparing beta-(tertiary butyl thio) propionic acid which comprises adding beta-propiolactone to a solution containing tertiary butyl mercaptan dissolved in aqueous alkali solution while maintaining the temperature in the range of 0 to 50° C., acidifying the solution and recovering the beta-(tertiary butyl thio) propionic acid thus formed.

6. The method of preparing beta-thio-phenoxy propionic acid which comprises adding beta-propiolactone to a solution containing thiophenol dissolved in aqueous alkali while maintaining the temperature in the range of 0 to 50° C., acidifying the solution and then recovering the beta-thio-phenoxy propionic acid thus formed.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,397,960 | Gribbins et al. | Apr. 9, 1946 |

FOREIGN PATENTS

| Number | Country | Date |
|---|---|---|
| 845,793 | France | Sept. 1, 1939 |

OTHER REFERENCES

Johansson, Berichte (Deutsch. Chem. Gesell.), vol. 48 pages 1262–1266 (1915).

Johansson, Chem. Zentralblatt, vol. 1916-II, pages 557–558.

---

Certificate of Correction

Patent No. 2,449,992.          September 28, 1948.

THOMAS L. GRESHAM ET AL.

It is hereby certified that errors appear in the printed specification of the above numbered patent requiring correction as follows:

Column 1, line 45, for "D'" read R'; column 5, lines 14 to 18 inclusive, for that portion of the formula reading

line 26, for "purposse" read *purposes*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.* of 0 to 50° C., acidifying the solution and recovering the beta-thio carboxylic acid thus formed.

2. The method of preparing a beta-thio propionic acid which comprises preparing a solution containing a mercaptan consisting exclusively of mercapto structure attached to a hydrocarbon residue, dissolved in an aqueous solution of an alkali, adding beta-propiolactone to the solution while maintaining the temperature in the range of 0 to 50° C., acidifying the solution and recovering the beta-thio propionic acid thus formed.

3. The method of claim 2 wherein the mercaptan is an alkyl mercaptan and the compound recovered is a beta-alkyl thio propionic acid.

4. The method of claim 2 wherein the mercaptan is an aryl mercaptan and the compound recovered is a beta-aryl thio propionic acid.

5. The method of preparing beta-(tertiary butyl thio) propionic acid which comprises adding beta-propiolactone to a solution containing tertiary butyl mercaptan dissolved in aqueous alkali solution while maintaining the temperature in the range of 0 to 50° C., acidifying the solution and recovering the beta-(tertiary butyl thio) propionic acid thus formed.

6. The method of preparing beta-thio-phenoxy propionic acid which comprises adding beta-propiolactone to a solution containing thiophenol dissolved in aqueous alkali while maintaining the temperature in the range of 0 to 50° C., acidifying the solution and then recovering the beta-thio-phenoxy propionic acid thus formed.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,397,960 | Gribbins et al. | Apr. 9, 1946 |

FOREIGN PATENTS

| Number | Country | Date |
|---|---|---|
| 845,793 | France | Sept. 1, 1939 |

OTHER REFERENCES

Johansson, Berichte (Deutsch. Chem. Gesell.), vol. 48 pages 1262–1266 (1915).

Johansson, Chem. Zentralblatt, vol. 1916–II, pages 557–558.

Certificate of Correction

Patent No. 2,449,992.   September 28, 1948.

THOMAS L. GRESHAM ET AL.

It is hereby certified that errors appear in the printed specification of the above numbered patent requiring correction as follows:

Column 1, line 45, for "D'" read R'; column 5, lines 14 to 18 inclusive, for that portion of the formula reading

line 26, for "purposse" read *purposes*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*